June 6, 1944. B. SOSNICK 2,350,647
LOCK NUT
Filed Nov. 17, 1939

INVENTOR
BENJAMIN SOSNICK
BY Boyken & Mohler
ATTORNEYS

Patented June 6, 1944

2,350,647

UNITED STATES PATENT OFFICE 2,350,647

LOCK NUT

Benjamin Sosnick, San Francisco, Calif.

Application November 17, 1939, Serial No. 304,933

3 Claims. (Cl. 151—37)

This invention relates to lock nuts and has for its objects improved means formed on a nut for preventing accidental unscrewing of such nut from a bolt when the latter is tightened against a fixed surface, and which means is cheaply and economically formed on such nut and does not injure the threads on a bolt. Another object is a nut provided with improved means for locking the same on a bolt against accidental unscrewing therefrom while permitting the same to be unscrewed without injury to the threads on the bolt upon application of intentional excessive force applied to the nut, and a still further object is improved means of the character described above which functions to secure the nut on a bolt upon normal tightening force being applied to the nut. Other objects and advantages will appear in the specification and drawing.

In the drawing, Fig. 1 is a perspective view of a nut showing the invention.

Figure 1:
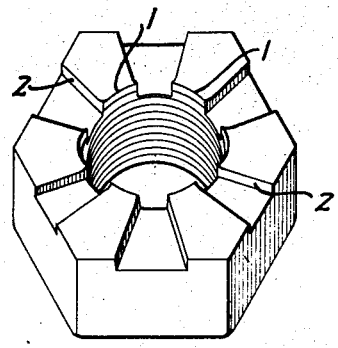
Figure 2:
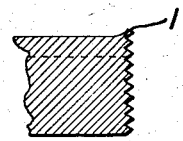
Fig. 2 is a fragmentary sectional view taken through one side of the nut of Fig. 1 transversely of the threads and through the locking means on such nut.

In detail, referring to Figs. 1 and 2 my invention comprises providing a burr 1 on a nut projecting outwardly around the threaded opening through such nut on the side of the nut that is adapted to engage another nut or object on the bolt against which the nut is to be tightened. The radially facing side or end of the nut on which the burr 1 is formed, is provided with radially extending grooves 2 at equally spaced points therearound, which grooves also extend across the burr, removing portions of the burr where the grooves are formed, as best indicated in Fig. 1. This radial grooving of the end of the nut is found to appreciably increase the locking effect of the nut and to facilitate the accomplishment of the said effect with no greater tightening force than is required in normal tightening of the conventional nut.

Figure 3:
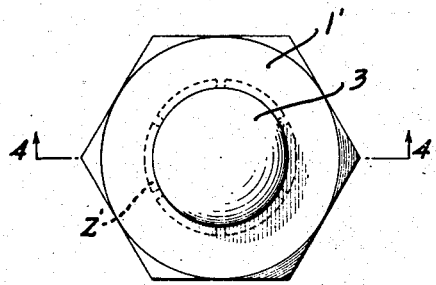
Fig. 3 is a plan view of a nut showing a slightly changed form of the invention.

In Fig. 3, a nut is shown in which the burr 1' only, is cut away at spaced points 2', and while the Figs. 1 and 2 show the preferred form of the invention, nevertheless, the burrs in Fig. 3 similarly function to cause the desired result.

In operation (best indicated in Fig. 4 for either form of the invention), the nut 1' is threaded onto bolt 3 following another plane nut 4 or any other desired object that closely fits the bolt. Upon tightening the nut 1' the burr 2' will engage the element 4 that preceded it onto the bolt, and will tightly jam the burr into the thread of the bolt and toward the body of the bolt by being bent or moved toward the bolt axis generally, since said burr is relatively easily distorted. The provision of the grooves or cut-out portions of the burr causes each section of the burr to grip circumferentially spaced surfaces in the bolt threads and thus tend to be pressed into the material of the bolt and to the surface of the object engaged by the nut. The result is a more secure locking of the nut on the bolt. Also by cutting away portions of the burr, the remaining portions are more readily distorted, or jammed against the bolt threads, and by cutting out sections of the end of the nut, as indicated on Fig. 1, there is a firmer seating of the nut and greater resistance between said end and the adjacent side of the object against which the bolt is tightened.

It will be noted (Figs. 2 and 4) that the radially outer sides of said burr are tapered in direction from their juncture with nut toward the central axis of the nut-opening, and that the outer edges of the burr are relatively sharp and thin, thus the only direction in which the burr can be distorted when the latter engages nut 4 or other object, is toward the central axis of the nut, or toward bolt 3. Hence a wedging or jamming of the burr on the bolt is assured. In the claims, unless otherwise specifically restricted, the term "burr" is intended to cover a continuous annular burr, or separate sections of an annular burr, whether substantially spaced apart or merely transversely split at one or more points.

Figure 4:
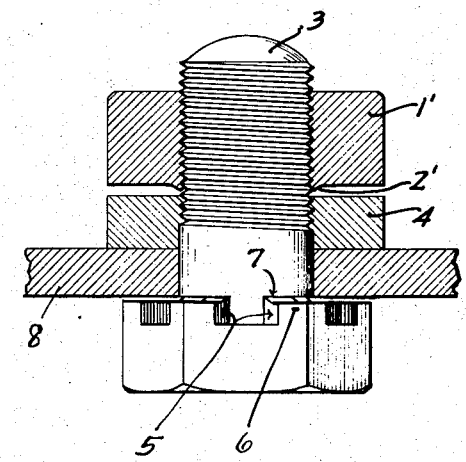
Fig. 4 is a sectional view of the nut of Fig. 3 taken along 4—4 thereof with the nut on a bolt and slightly spaced from a member against which the nut is to be tightened and which bolt also shows a form of the invention adapted to be used with any nut.

The bolt shown in Fig. 4 also shows the invention in which the inner side of the bolt head is slotted at 5 to provide grooves like those shown at 2 in Fig. 1. At their radially inner ends, the lands 6 (Fig. 4) extend slantingly toward the bolt shank as indicated at 7. The slanted ends of said lands tend to press into the surface of the member 8 to be engaged by the bolt head, thus preventing turning of the bolt.

In all forms of the invention disclosed, since there is no destruction or impairment of the nuts or bolts, they may be used again.

Having described my invention, I claim:

1. A lock nut having a threaded opening extending through the center thereof; a burr in the form of a slightly raised edge formed around said opening and projecting axially and outwardly of the body of said nut on the advancing side of the nut toward an object to be engaged by said burr and nut when the latter is screwed on a bolt toward such object; said burr having its radially outwardly facing side tapered in direction from the advancing side of the nut toward the outer edge of said burr, whereby upon tightening said nut against said object, said burr will be impinged between the thread of the bolt and said object to provide a tight engagement between said nut, bolt and object.

2. In a construction as defined in claim 1, said advancing side of said nut being formed with grooves extending transversely across that portion of said side disposed around said bolt, whereby the lands will tend to embed themselves in the surface contacted by the nut or bolt.

3. In combination with a body to be held by a bolt and nut formed with an aperture through which such bolt is adapted to extend in relatively close fitting relationship, and a bolt fitted in said aperture having a threaded end portion projecting from one side of said body provided with a nut thereon; a burr on said nut projecting axially from the side of the latter adjacent said body, said burr being formed with a relatively sharp axially outwardly facing edge adapted to closely follow the contour of the threads of said end portion and to wedging relation between said bolt and the sides of said aperture, the side of said nut facing said body being flat and being formed with a plurality of equally spaced radial grooves extending through said burr to the radially outer sides of said nut thereby dividing said burr into a plurality of equally spaced sections, the said burr being relatively thin in directions radially and axially of the said nut and the radially outwardly facing sides thereof being slightly tapered from said edge to the body of said nut to facilitate screwing said nut on said bolt to tight engagement between its grooved side and the said member when the said sections of said burr are moved to tight wedging relation between said bolt and the sides of said aperture adjacent said nut.

BENJAMIN SOSNICK.